United States Patent
Yu et al.

(10) Patent No.: US 9,785,216 B2
(45) Date of Patent: Oct. 10, 2017

(54) MANAGEMENT APPARATUS AND POWER MANAGEMENT METHOD

(71) Applicant: Silicon Integrated Systems Corp., Hsinchu (TW)

(72) Inventors: Mu-Tsan Yu, Hsinchu (TW); Min-Yan Ciou, Hsinchu (TW); Ying-Jyh Yeh, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 220 days.

(21) Appl. No.: 14/930,846

(22) Filed: Nov. 3, 2015

(65) Prior Publication Data

US 2016/0124482 A1     May 5, 2016

(30) Foreign Application Priority Data

Nov. 5, 2014   (TW) .............................. 103138438 A

(51) Int. Cl.
*G06F 1/00*      (2006.01)
*G06F 1/32*      (2006.01)

(52) U.S. Cl.
CPC .......... *G06F 1/3203* (2013.01); *G06F 1/3206* (2013.01); *G06F 1/3243* (2013.01); *Y02B 60/1239* (2013.01)

(58) Field of Classification Search
CPC .... G06F 1/3203; G06F 1/3206; G06F 1/3243; Y02B 60/1239
USPC ............................................. 178/19.01, 19.06
See application file for complete search history.

(56) References Cited

U.S. PATENT DOCUMENTS

2009/0065268 A1*  3/2009  Katsurahira ............ G06F 3/046
                                                178/19.01
2009/0065269 A1*  3/2009  Katsurahira ............ G06F 3/046
                                                178/19.06

* cited by examiner

*Primary Examiner* — Aurel Prifti
(74) *Attorney, Agent, or Firm* — Maschoff Brennan

(57) ABSTRACT

A power management apparatus and a power management method are provided. The method includes the following steps. Conduct a first current path during a first period. Provide a first voltage to an operation end when the first current path conducts and a microprocessor is disabled. The first voltage is used to selectively conduct a second path during the first period. Provide a second voltage to the microprocessor when the second current path conducts. The second voltage is used to turn on the microprocessor. Provide a third voltage to the operation end by the microprocessor when the microprocessor is turned on. The third voltage is used to keep the second current path conducted.

10 Claims, 3 Drawing Sheets

MANAGEMENT APPARATUS AND POWER MANAGEMENT METHOD

CROSS-REFERENCE TO RELATED APPLICATIONS

This non-provisional application claims priority under 35 U.S.C. §119(a) on Patent Application No(s). 103138438 filed in Taiwan, R.O.C. on Nov. 5, 2014, the entire contents of which are hereby incorporated by reference.

TECHNICAL FIELD

The disclosure relates to a power management apparatus and a method thereof, more particularly to a power management apparatus using a press key, and a method thereof.

BACKGROUND

Various electronic devices have been used in every aspect of modern day living with the enhancement of technology: especially the development of portable electronic devices has greatly advanced over the years.

The more a user fascinates about and uses a portable electronic device, the power consumption of the portable electronic device increases. If the user of the portable electronic device has some important or emergency documents to be done thereon and the portable electronic device is running out of power without a spare battery or other power supply devices and there is no charging socket or other charging platforms nearby, it may suspend any personal work progress and may also delay progress of any team work, possibly causing damage to a company's business, leading to uncountable losses. Therefore, power management is quite important for a portable electronic device.

In addition, it would be better if a modern portable electronic device is as small as possible. Herein, if a power management function can be fulfilled on a present circuit structure in the portable electronic device without adding extra circuits or electronic components, the burden on designing the portable electronic device to accomplish such a function may be reduced and manufacturing costs may be saved. This is advantageous to the manufacturers, suppliers and the users.

SUMMARY

For such deficiencies, the disclosure provides a power management apparatus and a method thereof to manage power by a present circuit structure used in portable electronic devices in order to maintain the size of the portable electronic device or save the costs for newly added electronic components. Furthermore, the disclosure uses a power saving mechanism to prevent the portable electronic device from wasting power.

In one or more embodiments, the power management method includes the following steps. Enable a first current path during a first period. Supply a first voltage to an operation end when the first current path is enabled and a microprocessor is disabled. The first voltage is used to selectively enable a second current path during the first period. Supply a second voltage to enable the microprocessor when the second current path is enabled. Supply a third voltage to the operation end by the microprocessor when the microprocessor is enabled. The third voltage is used to continue enabling the second current path.

In an embodiment, the power management method further includes the following steps. Enable the first current path during a second period. Supply a fourth voltage to the operation end when the first current path and the microprocessor are enabled. Determine whether the second period exceeds a preset time. Disable the microprocessor when the second period exceeds the preset time.

In an embodiment of the power management method, the first current path is enabled by a press key during the first period or the second period.

In an embodiment of the power management method, the step of determining whether the second period exceeds the preset time includes the following steps. Determine whether the fourth voltage is equal to the third voltage. Determine whether the second period exceeds the preset time when the fourth voltage is different from the third voltage.

In an embodiment of the power management method, when the first current path and the microprocessor are enabled, the step of supplying the fourth voltage to the operation end further includes the following step of outputting a driving voltage from the microprocessor in order to supply the fourth voltage to the operation end. The first voltage results from a division between a battery voltage and a grounded voltage. The third voltage results from a division between the driving voltage and the grounded voltage. The fourth voltage results from a division among the battery voltage, the grounded voltage and the driving voltage.

In one or more embodiments, the power management apparatus includes a press key, a first switch, a second switch, and a microprocessor. The press key is coupled to a battery and an operation end and can enable a first current path during a first period. A control terminal of the first switch is coupled to the operation end, and the first switch can selectively enable a second current path during the first period when its control terminal receives a first voltage. The second switch is coupled to the first switch and is used to selectively provide a second voltage. The microprocessor is coupled to the second switch and the operation end and supplies a third voltage to the operation end when enabled by the second voltage. The third voltage is used to continue enabling the second current path. The first switch receives the first voltage to enable the second current path when the first current path is enabled but the microprocessor is disabled. The second switch supplies the second voltage to enable the microprocessor when the second current path is enabled.

Accordingly, in the disclosure, when the microprocessor is disabled, the first current path is enabled by the press key during the first period to provide the first voltage to the operation end so that the first switch, the second current path and the second switch are selectively enabled during the first period to generate the second voltage for enabling the microprocessor to provide the third voltage to the operation end and then the second current path is continuously enabled. Also, when the microprocessor is enabled, the first current path is enabled by the press key during the second period to provide the fourth voltage to the operation end and a decision whether the second period exceeds the preset time is made in order to selectively disable the microprocessor. In this way, the disclosure gives the present circuit structure the power management function.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
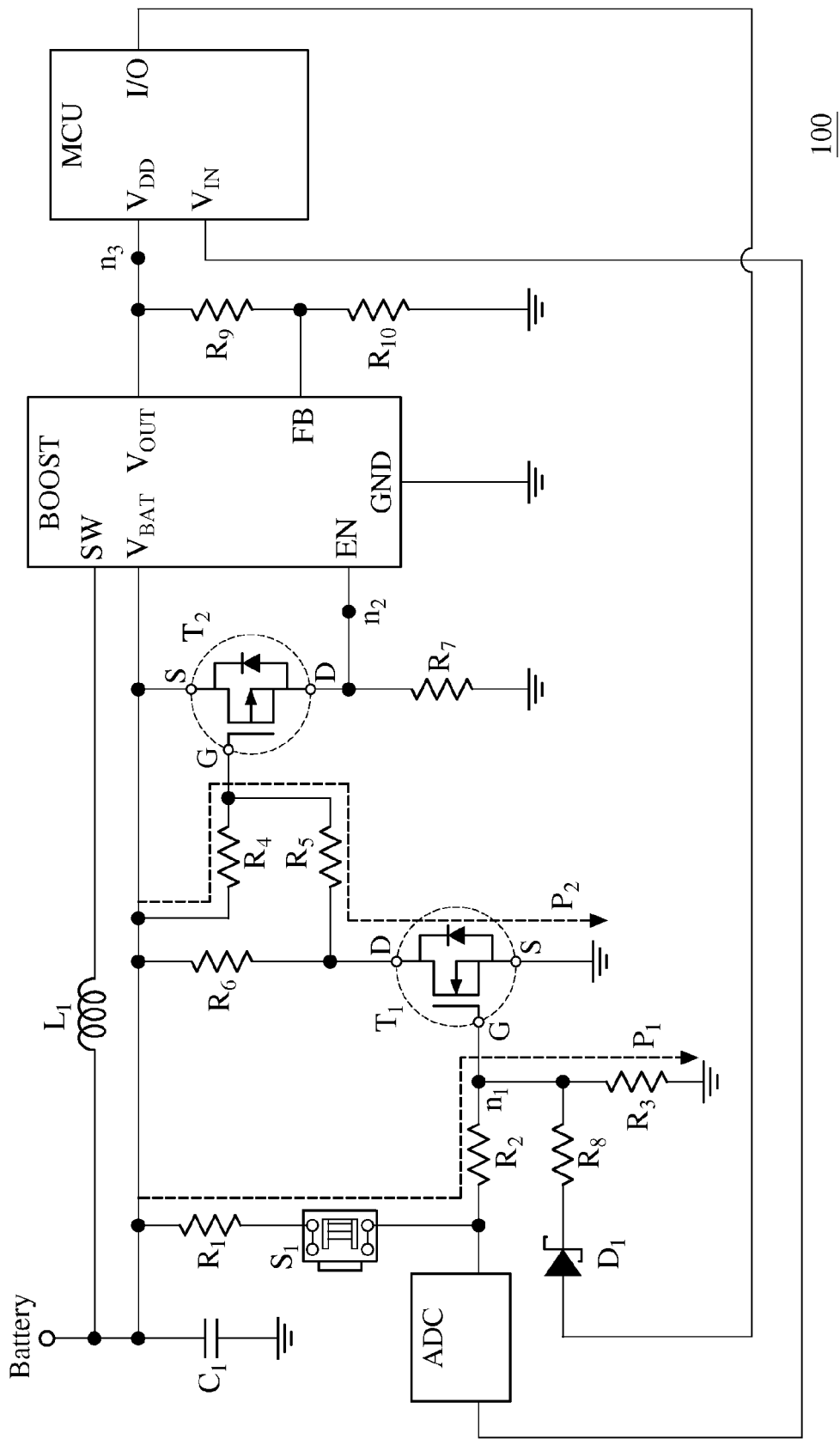
FIG. 1 is a schematic diagram of a power management apparatus in an embodiment.

FIG. 1 is a schematic diagram of a power management apparatus 100 in an embodiment. The power management apparatus 100 includes a press key S1, a first switch T1, a second switch T2, a microprocessor MCU, an analog to digital convertor ADC, and resistors R1, R2, R3, R4, R5, R6, R7 and R8. In this or some embodiments, the power management apparatus 100 further includes a boost circuit BOOST, resistors R9 and R10, a capacitor C1, an inductor L1, and a Zener diode D1. The press key S1 is coupled to a battery and an operation end n1. The first switch S1 has a control terminal that is coupled to the operation end n1. The second switch T2 is coupled to the first switch T1. The microprocessor MCU is coupled to the second switch T2 and the operation end n1. The power management apparatus and a method thereof in the disclosure can be applied to a variety of portable electronic devices. In this embodiment, the power management apparatus 100 is disposed in, for example, but not limited to, an active capacitance touch pen. The press key S1 is a variety of press keys, such as a side press key on the active capacitance touch pen. The first switch T1 and the second switch T2 are, for example, but not limited to, bipolar transistors (BJT) or field-effect transistors (FET). The microprocessor MCU is, for example, but not limited to, a variety of chips or processing units.

The press key S1 enables a first current path P1 during a first period or a second period. The first switch S1 selectively enables a second current path P2 during the first period after receiving a first voltage V1 using its control terminal. The second switch T2 selectively provides a node n2 with a specific voltage in order to enable the boost circuit BOOST. The enabled boost circuit BOOST increases voltage and supplies the increased voltage as a second voltage V2 to a node n3 after receiving a battery voltage Battery from the battery. In other words, the second switch T2 selectively supplies the second voltage V2 to the node n3. The microprocessor MCU receives the second voltage V2 and supplies a third voltage V3 to the operation end n1 after enabled. The third voltage V3 is applied to the Zener diode D1 in order to maintain the conduction of the second current path P2.

In this embodiment, when a user attempts to turn on the active capacitance touch pen disposed with the power management apparatus 100, the user can press the press key Si and hold the pressed press key S1 for a the first period in order to enable the first current path P1 during the first period, as shown in FIG. 1. The first current path P1 is fulfilled by the resistors R1, R2 and R3 and the operation end n1. The enabled first current path P1 applies the first voltage V1 onto the operation end n1, and the first voltage V1 results from a division between the battery voltage Battery and a grounded voltage. When the first current path P1 is enabled but the microprocessor MCU is disabled, the first switch T1 is enabled after receiving the first voltage V1, so as to enable the second current path P2. The second current path P2 is fulfilled by the resistors R4 and R5.

When the second current path P2 is enabled, the second switch T2 is enabled so that the boost circuit BOOST produces the second voltage V2 on the node n3 in order to enable the microprocessor MCU. The enabled microprocessor MCU can use its I/O terminal to output a driving voltage in order to apply the third voltage V3 onto the operation end n1. The third voltage V3 results from a division between the driving voltage and the grounded voltage. Accordingly, instead of passively enabling the first switch T1, the second switch T2 and the microprocessor MCU by the first voltage V1 generated when the press key S1 is manually pressed, the power management apparatus 100 automatically providing the third voltage V3 to actively enable the first switch T1, the second switch T2, the boost circuit BOOST and the microprocessor MCU. Therefore, the microprocessor MCU will continue enabling the second current path P2 even if the first current path P1 is cut off because of the unclasping of the press key S1 after the first period ends.

In this embodiment, the turned-off of the active capacitance touch pen disposed with the power management apparatus 100 can be performed by pressing the press key S1. When the first current path P1 and the microprocessor MCU are enabled, pressing the press key S1 for a second period will cause a fourth voltage V4 applied to the operation end n1. In general, the battery voltage Battery provided in the active capacitance touch pen is, for example, but not limited to, 1.5V, and the driving voltage provided by the microprocessor MCU is, for example, but not limited to, 3V. When the user presses the press key S1 during the enabled status of the first current path P1, the fourth voltage results from a division among the battery voltage Battery of 1.5V, the grounded voltage of 0V and the driving voltage of 3V. Therefore, when the enabled microprocessor MCU detects that the press key S1 is pressed, the operation end n1 will have a voltage drop.

When the analog to digital convertor ADC receives the voltage on the operation end n1 and applies this received voltage onto its VIN terminal, the microprocessor MCU can determine whether the fourth voltage V4 received at different time points is equal to the third voltage V3. Once the fourth voltage V4 is different from the third voltage V3, the microprocessor MCU will know that the press key S1 is pressed. Then, the microprocessor MCU further determines whether the second period, for which the press key S1 has been pressed, exceeds a preset time, in order to exclude the unexpectedly pressing of the press key S1. When the microprocessor MCU determines that the second period exceeds the preset time, the microprocessor MCU considers that the user attempts to turn off the active capacitance touch pen. In respond to the determination, the microprocessor MCU executes a switching-off instruction. After the microprocessor MCU is disabled, the boost circuit BOOST as well as other circuits in the active capacitance touch pen are also disabled.

In another embodiment, after the microprocessor MCU is enabled, the microprocessor MCU calculates its idle period that indicates whether the user is using the active capacitance touch pen. When the idle period exceeds a threshold, it indicates that the user has stopped using the active capacitance touch pen but may have forgotten to turn it off.

Herein, the microprocessor MCU can automatically disable itself. After the microprocessor MCU is automatically disabled, the boost circuit BOOST and even other circuits in the active capacitance touch pen are also disabled in order to save power.

In another embodiment, the microprocessor MCU looks up an executable event in a lookup table in response to a command, which the user uses the press key to input. For example, when the user continuously presses the press key twice quickly, it may be considered that the operation mode of the active capacitance touch pen is switched to either a power save mode, a normal mode or a high efficiency mode. However, the lookup table includes, for example, but not limited to, various commands, which the press key is used to input, and an executable event corresponding to each of the commands.

Figure 2:
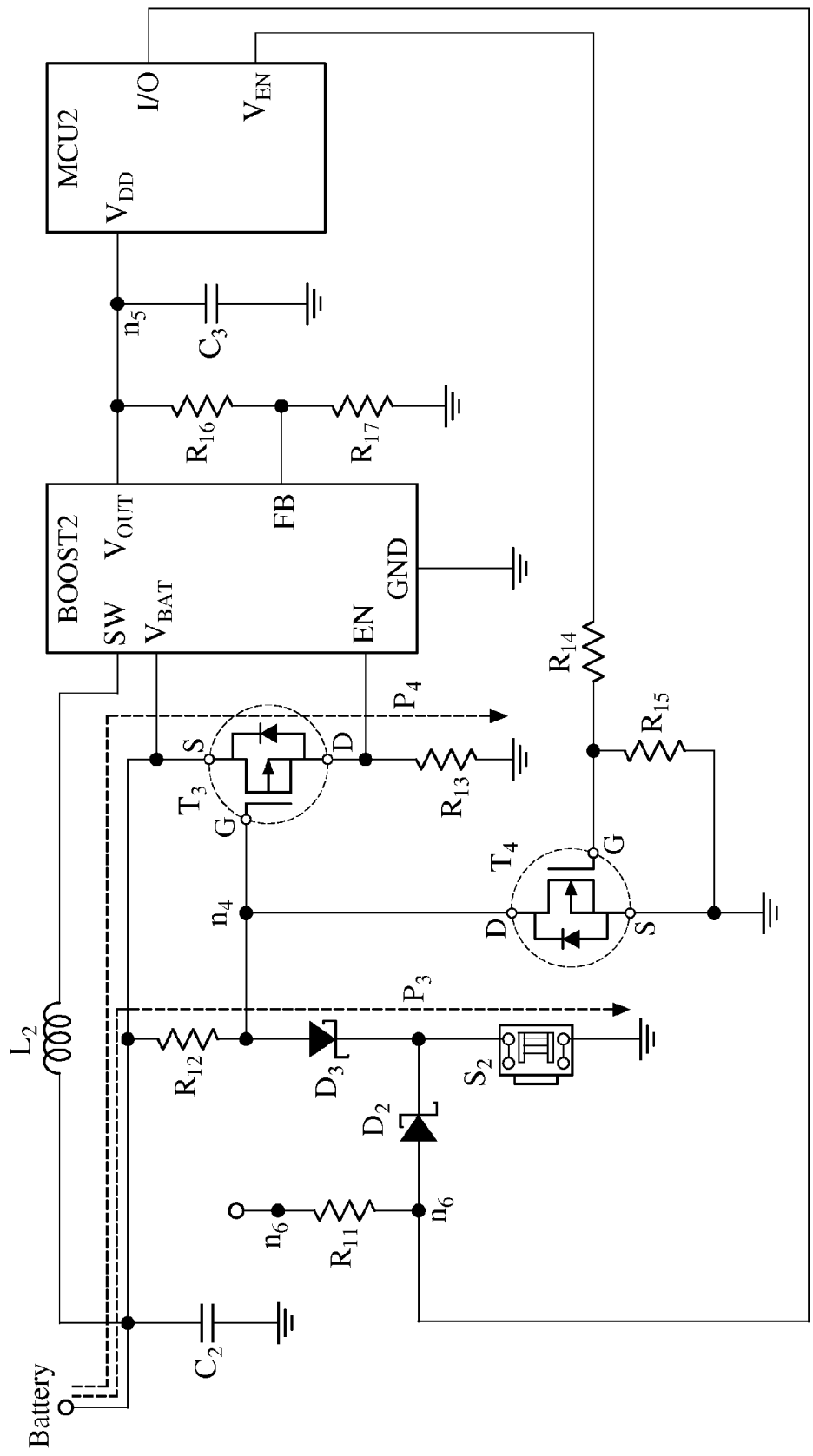
FIG. 2 is a schematic diagram of a power management apparatus in another embodiment.

FIG. 2 is a schematic diagram of a power management apparatus 200 in another embodiment. The power management apparatus 200 includes a press key S2, a first switch T3, a second switch T4, a microprocessor MCU2, and resistors R11, R12, R13, R14, R15, R16 and R17. The power management apparatus 200 also includes a boost circuit BOOST2, capacitors C2 and C3, an inductor L2, and Zener diodes D2 and D3. In this embodiment, the power management apparatus 200 is disposed in, for example, but not limited to, an active capacitance touch pen.

The press key S2 functions to enable a first current path P3 during a first period or a second period. When a battery is put into the active capacitance touch pen, the first switch T3 has not yet been turned on so that the boost circuit BOOST2 doesn't start working. Herein, the microprocessor MCU2 has not started yet. If a user presses the press key S2 and holds it for a first period, then the first current path P3 is enabled and applies a first voltage V1 to an operation end n4. The first voltage functions to selectively enable a second current path P4 during the first period. Herein, the first switch T3 is turned on, and the second current path P4 is enabled. After the second current path P4 is enabled, the boost circuit BOOST2 is enabled to apply a second voltage V2 (e.g. generated by increasing the battery voltage Battery) to nodes n5 and n6, that is, the enabled second current path P4 generates the second voltage V2 to the node n5 in order to enable the microprocessor MCU2.

When the microprocessor MCU2 is enabled, the enabled microprocessor MCU2 may use its VEN terminal to output the driving voltage to a control terminal of the second switch T4 so that the second switch T4 keeps turned-on and the third voltage V3 is continuously applied onto the operation end n4. The third voltage V3 functions to keep the first switch T3 and the second current path P4 on.

In this embodiment, after the microprocessor MCU2 is enabled, if the user presses the press key S2 and holds it for the second period, the first current path P3 will be enabled during the second period. The enabling of the first current path P3 causes the enabling of the Zener diode D2 so a fourth voltage V4 (i.e. the grounded voltage) is applied onto the node n6 (i.e. the fourth voltage V4 is applied to the operation end n4). Subsequently, the microprocessor MCU2 uses its I/O terminal to sense the voltage on the node n6 (or the operation end n4) and determines whether the second period which the press key S2 has pressed for exceeds a preset time. When the second period exceeds the preset time, the microprocessor MCU2 sets the driving voltage to be at a low logic level and outputs it to the control terminal of the second switch T4 in order to disable the second switch T4. When the user unclasps the press key S2, the first switch T3 as well as the boost circuit BOOST2 are disabled, resulting in the disabling of the microprocessor MCU2.

Figure 3:
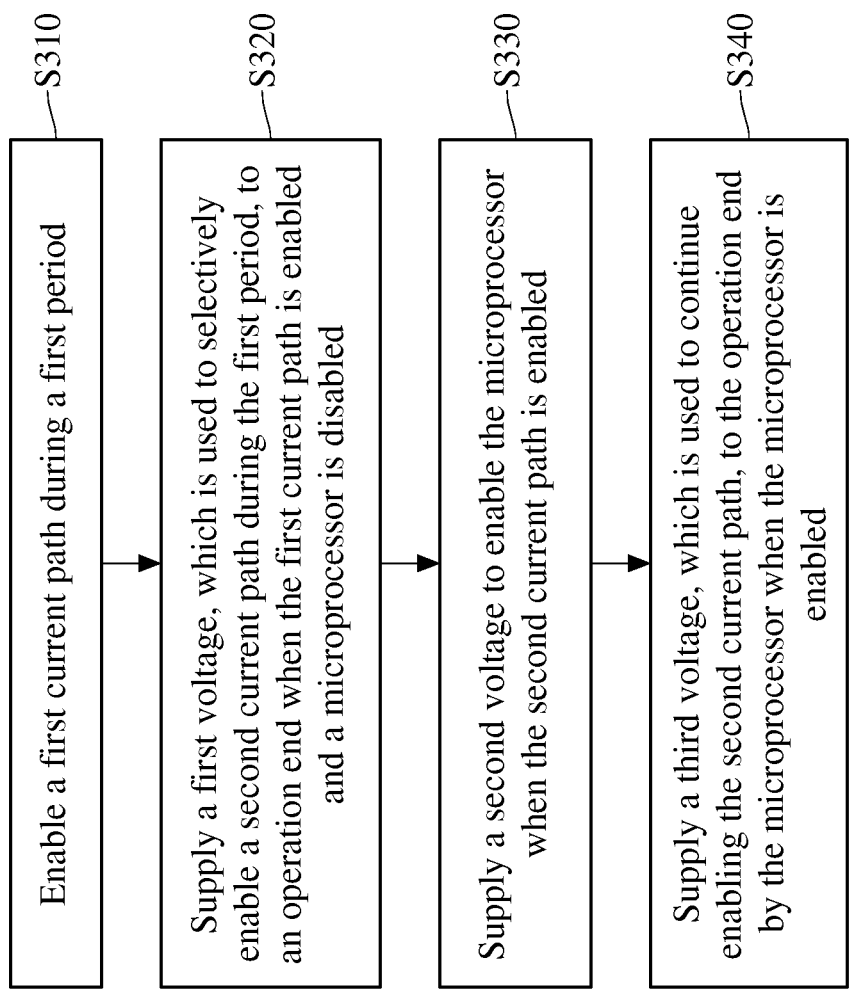
FIG. 3 is a flow chart of a power management method in an embodiment.

FIG. 3 is a flow chart of a power management method in an embodiment. The power management method includes the following steps S310~S340. The details of the method are described below with respect to FIG. 1 or FIG. 2.

In step S310, enable the first current path during the first period by the press key. In step S320, supply the first voltage V1 to the operation end when the first current path is enabled but the microprocessor is disabled. The first voltage V1 is used to selectively enable the first switch and the second current path during the first period. In step S330, when the second current path is enabled, the second switch is enabled so as to supply the second voltage V2 to the microprocessor. The second voltage V2 is used to enable the microprocessor. In step S340, when the microprocessor is enabled, the microprocessor supplies the third voltage V3 to the operation end. The third voltage V3 functions to keep the second current path enabled.

As set forth above, when the microprocessor is disabled, the press key is used to enable the first current path during the first period so that the first voltage is applied to the operation end to selectively enable the first switch, the second current path and the second switch or enable the boost circuit during the first period. Therefore, the second voltage is generated to enable the microprocessor to provide the third voltage for self driving to the operation end in order to keep the second current path enabled. When the microprocessor is enabled, the press key is used to enable the first current path during the second period so that the enabled first current path can apply the fourth voltage V4 to the operation end. Also, a decision whether the second period exceeds a preset time can be made in order to selectively disable the microprocessor. In addition, when the microprocessor is enabled, the microprocessor selectively and automatically disables itself based on the idle period. After the microprocessor is disabled, the boost circuit is accordingly disabled, and then all circuits within the active capacitance touch pen stops operating in order to save power. The microprocessor may also use the lookup table to select a power usage mode in response to a command inputted using the press key operated by a user. In this way, the present circuit structure in a portable electronic device becomes capable of managing power and uses a power saving mechanism to prevent the portable electronic device from wasting power.

What is claimed is:

1. A power management method, comprising:
    enabling a first current path during a first period;
    supplying a first voltage, which is used to selectively enable a second current path during the first period, to an operation end when the first current path is enabled and a microprocessor is disabled;
    supplying a second voltage to enable the microprocessor when the second current path is enabled; and
    supplying a third voltage, which is used to continue enabling the second current path, to the operation end by the microprocessor when the microprocessor is enabled.

2. The power management method according to claim 1, further comprising:
    enabling the first current path during a second period;
    supplying a fourth voltage to the operation end when the first current path and the microprocessor are enabled;
    determining whether the second period exceeds a preset time; and
    disabling the microprocessor when the second period exceeds the preset time.

3. The power management method according to claim 2, wherein the first current path is enabled by a press key during the first period or the second period.

4. The power management method according to claim 2, wherein determining whether the second period exceeds the preset time comprises:
   determining whether the fourth voltage is equal to the third voltage; and
   determining whether the second period exceeds the preset time when the fourth voltage is different from the third voltage.

5. The power management method according to claim 4, wherein when the first current path and the microprocessor are enabled, supplying the fourth voltage to the operation end further comprises:
   outputting a driving voltage from the microprocessor in order to supply the fourth voltage to the operation end;
   wherein the first voltage results from a division between a battery voltage and a grounded voltage, the third voltage results from a division between the driving voltage and the grounded voltage, and the fourth voltage results from a division among the battery voltage, the grounded voltage and the driving voltage.

6. A power management apparatus, comprising:
   a press key coupled to a battery and an operation end and configured to enable a first current path during a first period;
   a first switch having a control terminal that is coupled to the operation end, and configured to selectively enable a second current path during the first period when the control terminal of the first switch receives a first voltage;
   a second switch coupled to the first switch and configured to selectively supply a second voltage; and
   a microprocessor coupled to the second switch and the operation end and configured to supply a third voltage, which is used to continue enabling the second current path, to the operation end after being enabled by the second voltage;
   wherein the first switch receives the first voltage to enable the second current path when the first current path is enabled but the microprocessor is disabled; and
   the second switch supplies the second voltage to enable the microprocessor when the second current path is enabled.

7. The power management apparatus according to claim 6, wherein the press key further enables the first current path during a second period, and a fourth voltage is supplied to the operation end when the first current path and the microprocessor are enabled.

8. The power management apparatus according to claim 7, wherein the microprocessor further determines whether the second period exceeds a preset time; and the microprocessor is disabled when the second period exceeds the preset time.

9. The power management apparatus according to claim 8, further comprising:
   an analog to digital convertor coupled to the microprocessor and the operation end,
   wherein the microprocessor further receives the fourth voltage and the third voltage through the analog to digital convertor and determines whether the fourth voltage is equal to the third voltage; and when the fourth voltage is different from the third voltage, the microprocessor determines whether the second period exceeds the preset time.

10. The power management apparatus according to claim 7, wherein the microprocessor further outputs a driving voltage in order to supply the fourth voltage to the operation end; and
   the first voltage results from a division between a battery voltage and a grounded voltage, the third voltage results from a division between the driving voltage and the grounded voltage, and the fourth voltage results from a division among the battery voltage, the grounded voltage and the driving voltage.

\* \* \* \* \*